(12) United States Patent
Edler et al.

(10) Patent No.: US 10,753,447 B2
(45) Date of Patent: Aug. 25, 2020

(54) ELECTRO-HYDRAULIC LIMITED SLIP DIFFERENTIAL SYSTEM

(71) Applicant: Eaton Corporation, Cleveland, OH (US)

(72) Inventors: Andrew N. Edler, Homer, MI (US); Ashish Wadhva, Maharastra (IN); Brian St. John, Charlotte, MI (US); Kandice Kawala, Chesterfield, MI (US); Randy Graves, Elkton, MI (US); Daniel P. Fisher, Coldwater, MI (US)

(*) Notice: Subject to any disclaimer, the term of this patent is extended or adjusted under 35 U.S.C. 154(b) by 93 days.

(21) Appl. No.: 15/928,688

(22) Filed: Mar. 22, 2018

(65) Prior Publication Data
US 2018/0209528 A1    Jul. 26, 2018

Related U.S. Application Data

(63) Continuation of application No. PCT/US2016/052876, filed on Sep. 21, 2016.

(51) Int. Cl.
| | |
|---|---|
| *F16H 48/22* | (2006.01) |
| *F16H 48/38* | (2012.01) |
| *F16D 25/0638* | (2006.01) |
| *F16H 48/32* | (2012.01) |

(Continued)

(52) U.S. Cl.
CPC ......... *F16H 48/22* (2013.01); *F16D 25/0638* (2013.01); *F16H 48/32* (2013.01); *F16H 48/38* (2013.01); *F16H 57/037* (2013.01); *F16H 48/08* (2013.01)

(58) Field of Classification Search
CPC ................... B60K 2023/043; B60K 2023/046
See application file for complete search history.

(56) References Cited

U.S. PATENT DOCUMENTS

| | | | |
|---|---|---|---|
| 4,679,463 A | 7/1987 | Ozaki et al. | |
| 4,963,759 A | 10/1990 | Leonti et al. | |
| 5,582,557 A | 12/1996 | Dissett et al. | |

(Continued)

FOREIGN PATENT DOCUMENTS

| | | |
|---|---|---|
| EP | 1559931 A2 | 8/2005 |
| WO | 2011045661 A1 | 4/2011 |

(Continued)

OTHER PUBLICATIONS

International Search Report and Written Opinion for International Application No. PCT/US2016/052876 dated Jan. 4, 2017, 15 pages.

(Continued)

*Primary Examiner* — Timothy Hannon
(74) *Attorney, Agent, or Firm* — RMCK Law Group PLC (57) ABSTRACT

An electro-hydraulic limited slip differential system for a vehicle includes an axle assembly having an axle housing having an aperture formed therein, and an electro-hydraulic limited slip differential assembly disposed within the axle housing. The limited slip differential assembly includes a differential case, a differential gear assembly disposed in the differential case, a clutch assembly having a clutch pack and a clutch actuator assembly, and a hydraulic fitting disposed at least partially within the aperture. The hydraulic fitting is coupled to a hydraulic port of the clutch actuator assembly.

8 Claims, 10 Drawing Sheets

(51) Int. Cl.
    *F16H 57/037*     (2012.01)
    *F16H 48/08*     (2006.01)

(56) References Cited

U.S. PATENT DOCUMENTS

| | | |
|---|---|---|
| 6,095,939 A | 8/2000 | Burns et al. |
| 9,080,622 B2 | 7/2015 | Edler et al. |
| 2003/0017902 A1 | 1/2003 | Duan |
| 2005/0167228 A1 | 8/2005 | Baxter |
| 2009/0029821 A1* | 1/2009 | Martin, III ............... B60G 3/20 475/231 |
| 2009/0215575 A1 | 8/2009 | Schrand et al. |
| 2011/0092329 A1 | 4/2011 | Fox |
| 2014/0179484 A1* | 6/2014 | Fox .................. F16H 48/32 475/231 |
| 2016/0084365 A1 | 3/2016 | Besemer et al. |

FOREIGN PATENT DOCUMENTS

| | | |
|---|---|---|
| WO | 2014197365 A1 | 12/2014 |
| WO | 2015021213 A1 | 2/2015 |
| WO | 2015041917 A1 | 3/2015 |

OTHER PUBLICATIONS

International Search Report for International Application No. PCT/US2017/042205 dated Oct. 24, 2017, 15 pages.
European Search Report for EP Application No. 16 849 501 dated May 29, 2019.

\* cited by examiner

ELECTRO-HYDRAULIC LIMITED SLIP DIFFERENTIAL SYSTEM

CROSS-REFERENCE TO RELATED APPLICATIONS

This application is a continuation of International Application No. PCT/US2016/052876 filed Sep. 21, 2016, which claims the benefit of U.S. Provisional Patent Application No. 62/222,917 filed on Sep. 24, 2015; U.S. Provisional Patent Application No. 62/261,497 filed on Dec. 1, 2015; U.S. Provisional Patent Application No. 62/301,086 filed Feb. 29, 2016; and Indian Patent Application No. 201611014792 filed on Apr. 28, 2016. This application is a continuation of International Application No. PCT/US2017/042205 filed Jul. 14, 2017, which claims priority to U.S. Provisional Patent Application No. 62/362,384 filed Jul. 14, 2016. The disclosures of the above applications are incorporated herein by reference.

FIELD

The present disclosure relates generally to a vehicle differential and, more particularly, to an electro-hydraulic limited slip differential.

BACKGROUND

Differentials are provided on vehicles to permit an outer drive wheel to rotate faster than an inner drive wheel during cornering as both drive wheels continue to receive power from the engine. While differentials are useful in cornering, they can allow vehicles to lose traction, for example, in snow or mud or other slick mediums. If either of the drive wheels loses traction, it will spin at a high rate of speed and the other wheel may not spin at all. To overcome this situation, limited slip differentials were developed to shift power from the drive wheel that has lost traction and is spinning to the drive wheel that is not spinning.

Electronically controlled, limited slip differentials can include a hydraulically actuated clutch to limit differential rotation between output shafts of the differential. However, some vehicles may experience trailer sway or oversteer during cornering. While such known systems function for their intended purposes, it is desirable to provide improved differential systems to counteract or mitigate trailer sway.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

In one aspect, an electro-hydraulic limited slip differential system for a vehicle is provided. The system includes an axle assembly having an axle housing having an aperture formed therein, and an electro-hydraulic limited slip differential assembly disposed within the axle housing. The limited slip differential assembly includes a differential case, a differential gear assembly disposed in the differential case, a clutch assembly having a clutch pack and a clutch actuator assembly, and a hydraulic fitting disposed at least partially within the aperture. The hydraulic fitting is coupled to a hydraulic port of the clutch actuator assembly.

In addition to the foregoing, the described system may include one or more of the following features: a hydraulic control unit configured to be coupled to a portion of the vehicle remote from the axle assembly, the hydraulic control unit coupled to the hydraulic fitting and configured to supply a hydraulic fluid to the clutch actuator assembly to selectively actuate the clutch assembly; wherein the hydraulic control unit is configured to couple to a cross-member of the vehicle underbody; wherein the hydraulic control unit includes an integrated accumulator and sump; wherein the hydraulic control unit further includes a motor, a hydraulic pump, and at least one sensor; wherein the hydraulic fitting is a dual O-ring seal configured to fluidly seal the clutch actuator assembly and a sump of the axle assembly; a plurality of force transfer rods that couple the clutch pack and the clutch actuator assembly; wherein the clutch pack is disposed inside the differential case, and the clutch actuator assembly is disposed outside of the differential case; wherein the clutch actuator assembly is rotatably coupled to a hub protruding from the differential case; a plurality of transfer rods coupled between the clutch pack and the clutch actuator assembly; wherein the clutch pack further comprises a first transfer plate and the clutch actuator assembly further comprises a second transfer plate, wherein the plurality of transfer rods is coupled between the first and second transfer plates; wherein the clutch actuator assembly includes a piston received in a piston housing, the actuator assembly configured to actuate the clutch pack.

In another aspect, a vehicle is provided. The vehicle includes an underbody support member and an electro-hydraulic limited slip differential system. The system includes an axle assembly including an axle housing having an aperture formed therein, a hydraulic control unit coupled to the underbody support member at a location remote from the axle assembly, and an electro-hydraulic limited slip differential assembly disposed within the axle housing. The differential assembly includes a differential case, a differential gear assembly disposed in the differential case, and a clutch assembly having a clutch pack and a clutch actuator assembly. A hydraulic fitting is disposed at least partially within the aperture and is coupled to a hydraulic port of the clutch actuator assembly and to the hydraulic control unit. The hydraulic control unit is configured to supply a hydraulic fluid to the clutch actuator assembly to selectively actuate the clutch assembly.

In addition to the foregoing, the described vehicle may include one or more of the following features: wherein the underbody support member is a cross-member of the vehicle underbody; wherein the hydraulic control unit includes an integrated accumulator and sump; wherein the hydraulic control unit further includes a motor, a hydraulic pump, a control valve, and at least one sensor; wherein the hydraulic control unit includes a first electrical conduit coupled to the control valve, a second electrical conduit coupled to the motor and hydraulic pump, and a third electrical conduit coupled to the at least one sensor, the first, second, and third electrical conduits electrically coupled to an electronic control module; a hydraulic conduit fluidly coupled between the hydraulic control unit and the hydraulic fitting; an electronic control unit disposed within the vehicle and in signal communication with the hydraulic control unit; and a selector box in signal communication with the hydraulic control unit, the selector box configured to switch the electro-hydraulic limited slip differential system on and off.

BRIEF DESCRIPTION OF THE DRAWINGS

The present disclosure will become more fully understood from the detailed description and the accompanying drawings, wherein.

DETAILED DESCRIPTION

Figure 1:
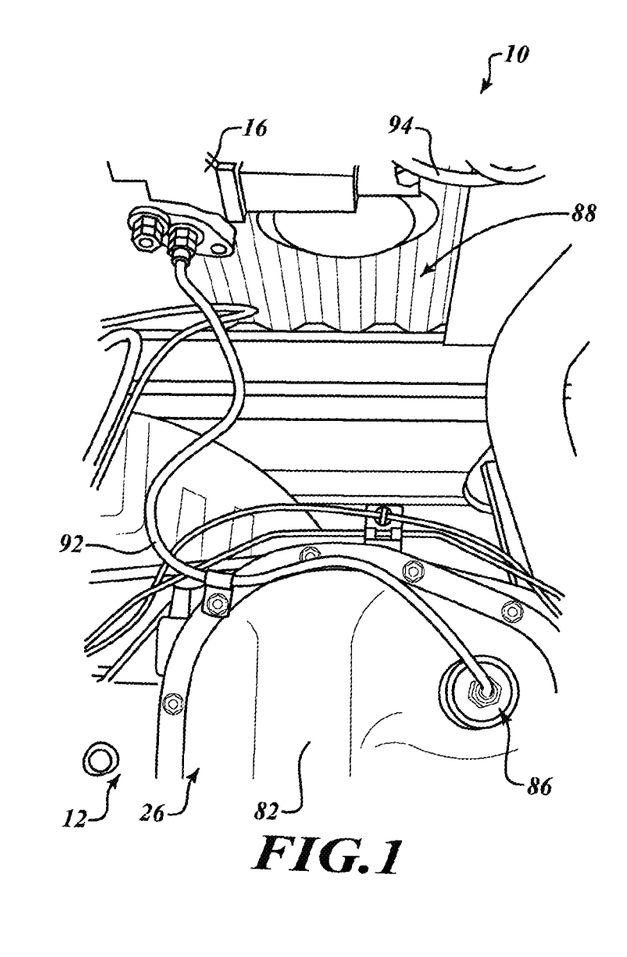
FIG. 1 is a side view of an example electro-hydraulic limited slip differential system in accordance with the principles of the present disclosure.
Figure 2:
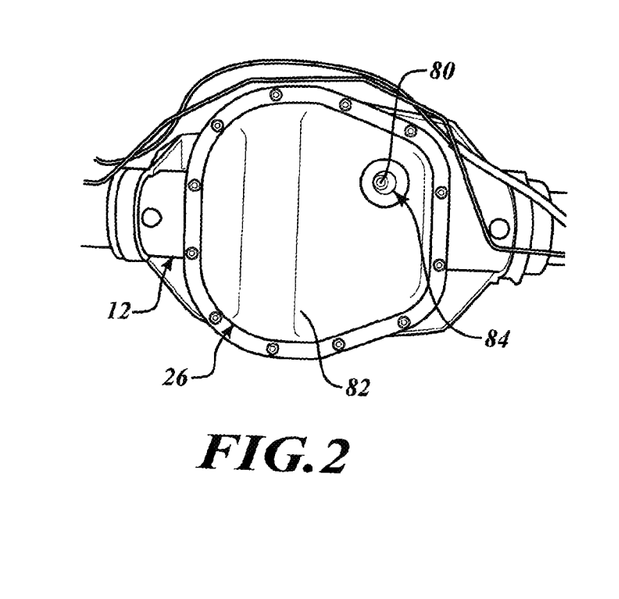
FIG. 2 is another side view of the electronic limited slip differential system with an example hydraulic control unit removed in accordance with the principles of the present disclosure.
Figure 3:
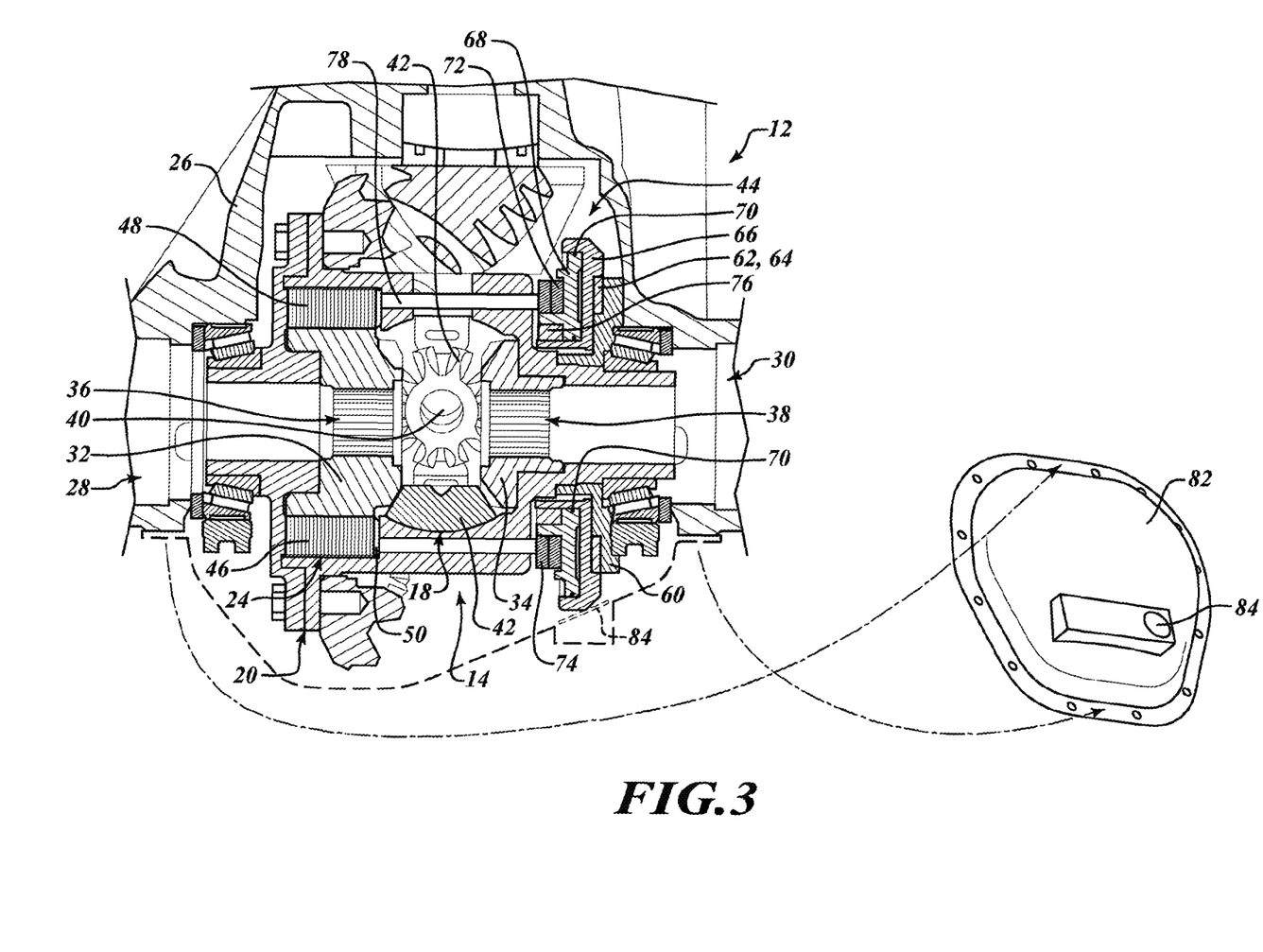
FIG. 3 is a cross-sectional view of the limited slip differential system shown in FIGS. 1 and 2.

With initial reference to FIGS. 1-3, an example electro-hydraulic limited slip differential (LSD) system 10 is shown. In the illustrated example, the electro-hydraulic LSD system 10 generally includes an axle assembly 12, an electro-hydraulic limited slip differential assembly 14 (FIGS. 3-5), and a hydraulic control unit 16.

Figures 4, 5:
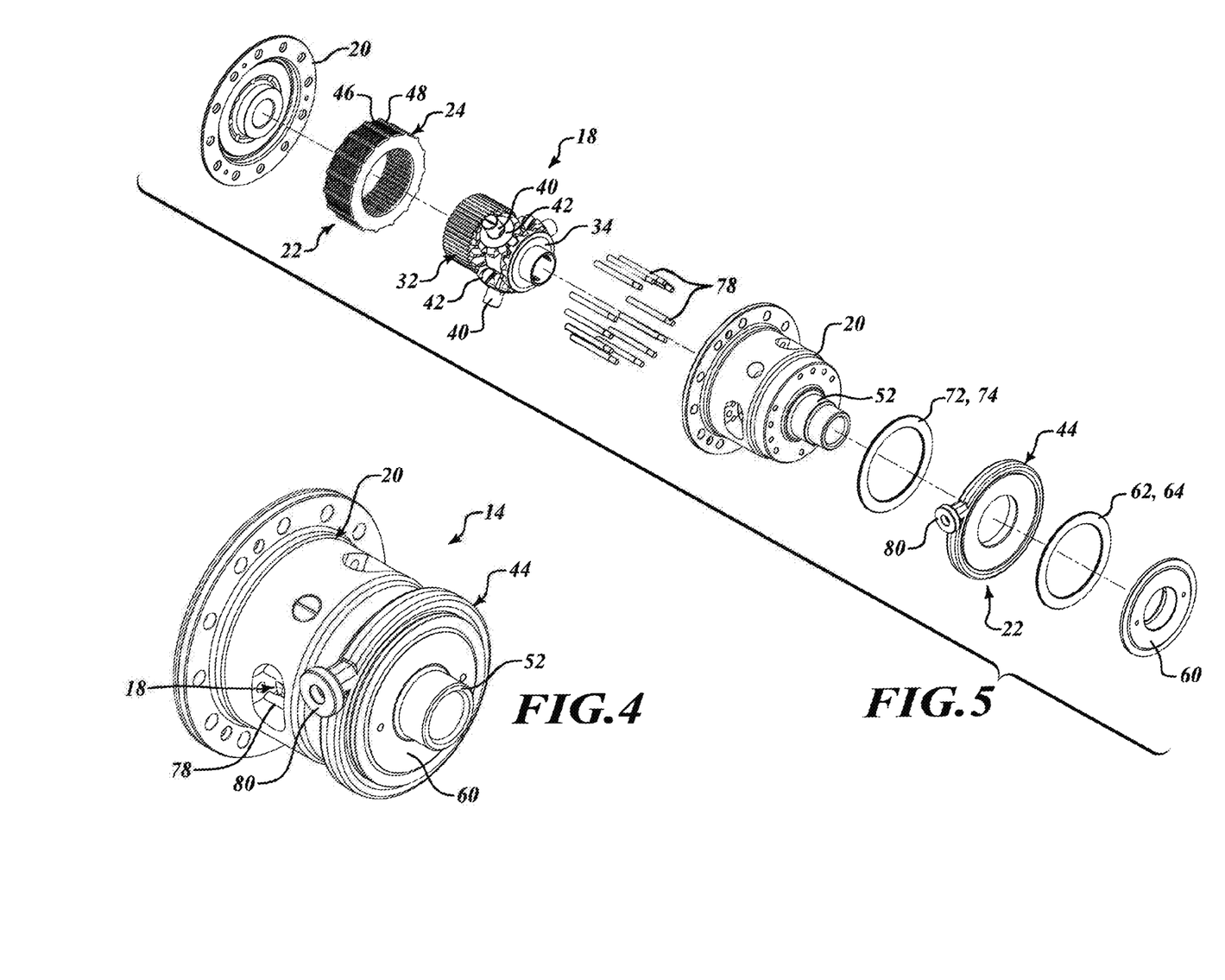
FIG. 4 is a perspective view of an example limited slip differential assembly that may be used in the system shown in FIGS. 1-3 in accordance with the principles of the present disclosure.
FIG. 5 is an exploded view of the limited slip differential assembly shown in FIG. 4.

With reference to FIGS. 3-5, the electronic limited differential assembly 14 can generally include a differential gear assembly or mechanism 18 arranged in a differential case 20, and a clutch assembly 22. The limited slip differential assembly 14 can be received in a housing 26 of the axle assembly 12 and operates to drive a pair of axle shafts (not shown) received through axle shaft openings 28, 30 and connected to drive wheels (not shown). In general, the limited slip differential assembly 14 functions as a traditional open differential during normal operating conditions until an event occurs where a bias torque is required. For example, when a loss in traction is detected or anticipated, the clutch assembly 22 can be selectively actuated in order to generate the optimum bias ratio for the situation.

With continued reference to FIGS. 4 and 5, the differential gear assembly 18 can include a pair of side gears 32, 34 that are mounted for rotation with the axle shafts (and first and second drive wheels). The side gears 32, 34 define first and second axle shaft openings 36, 38 (FIG. 3). A cross pin or pinion gear shaft 40 can be fixedly mounted to the differential case 20 for rotation therewith. A corresponding set of pinion gears 42 (e.g., three pinion gears 42) are mounted for rotation with the pinion gear shaft 40 and are in meshing relationship with both of the side gears 32, 34. In an open configuration, described more fully below, the differential gear assembly 18 acts to allow the axle shafts to rotate at different speeds.

The clutch assembly 22 couples an input of the limited slip differential assembly 14 with the differential gear assembly 18. In some examples, the input can comprise a ring gear fixedly arranged around the differential case 20 that is driven by a pinion gear. The clutch assembly 22 can generally comprises a clutch pack 24 and a piston/plenum or clutch actuator assembly 44.

The clutch pack 24 includes a plurality of annular plates 46 interleaved between a plurality of annular friction disks 48. The plurality of annular plates 46 can be coupled for rotation with one of the differential case 20 and the differential gear assembly 18. The plurality of annular friction disks 48 can be coupled for rotation with the other one of the differential case 20 and the differential gear assembly 18.

In the illustrated example, the plurality of annular plates 46 are coupled for rotation to the differential case 20 (e.g., splined to an inner diameter of the differential case 20) and the plurality of annular friction disks 48 are coupled for rotation with the differential gear assembly 18 (e.g., splined to an outer diameter of the side gear 32). It will be appreciated that the annular friction disks 48 may be supported for rotation by either of the side gears 32 or 34, or both. A first transfer plate 50 can be arranged as part of the clutch pack 24.

The plurality of annular plates 46 and annular friction disks 48 are interleaved between one another and act to rotate past one another in substantially non-contacting relationship when the clutch assembly 22 is in its open position. However, it will be appreciated by those skilled in the art that the term "non-contacting" as used herein is relative and is not meant to necessarily indicate that the annular plates 46 and annular friction disks 48 have absolutely no contact when the clutch assembly 22 is in the open condition. The annular plates 46 and annular friction disks 48 are axially movable into frictional engagement relative to one another, thereby reducing relative rotation between the annular plates 46 and annular friction disks 48 when the clutch assembly 22 is in the closed or partially closed configurations. In this manner, when the clutch assembly 22 is in its closed position, the side gears 32, 34, as well as the axle shafts and the drive wheels rotate together.

The clutch assembly 22 can operate in an open configuration to allow the side gears 32, 34 to rotate independently from each other, e.g., at different speeds. The clutch assembly 22 can also operate in a closed or partially closed configuration where the side gears 32, 34 rotate together or partially together (that is, not independently), e.g., at substantially the same speed. The clutch assembly 22 can, for example, be a hydraulic clutch assembly 22 that utilizes pressurized hydraulic fluid that can act on the clutch actuator assembly 44 to selectively actuate the clutch pack 24 between the open, closed and partially closed configurations.

With particular reference now to FIGS. 3-5, the clutch actuator assembly 44 will be further described. The clutch actuator assembly 44 is arranged on an opposite end of the differential case 20 as the clutch pack 24. Moreover, the clutch actuator assembly 44 can be disposed on an outside of the differential case 20, and the clutch pack 24 can be disposed inside the differential case 20. As shown in FIG. 4, the clutch actuator assembly 44 can be rotatably mounted to a hub 52 extending from the differential case 20. As a result, a number of advantages are realized. For example, the resulting package size of the electronic limited slip differential assembly 14 is reduced, the cross-shaft 40 is centered between bearing races, and stock axle shafts having standard lengths can be used. Moreover, the clutch pack 24 can be constructed larger to provide greater torque capacity, and the electronic limited slip differential assembly 14 can be replaced with an "open" differential on the same assembly line.

The clutch actuator assembly 44 can generally include a retainer 60, a first needle roller 62, a bearing race 64, a piston housing 66, a piston 68, a series of O-rings 70, a second needle roller 72, and a second transfer plate 74. The second transfer plate 74 can act as a bearing race for the second needle roller 72. The piston housing 66 can generally define an annular pocket 76. The piston 68 is configured to ride within the annular pocket 76 upon introduction of hydraulic fluid between the piston 68 and the piston housing 66. The O-rings 70 sealingly engage the piston housing 66. During operation, the piston housing 66 does not rotate.

A plurality of force transfer rods 78 are disposed between the second transfer plate 74 of the clutch actuator assembly 44 and the first transfer plate 50 of the clutch pack 24. The transfer rods 78 can be spaced equally around the differential case 20 and various quantities of transfer rods are contemplated. Furthermore, other structures may be used to transfer force between the first and second transfer plates 50, 74.

During operation, movement of the piston 68 leftward (as viewed in FIGS. 3-5) causes the force transfer rods 78 to push the first transfer plate 50 leftward causing the clutch pack 24 to close. Similarly, when pressure is released from the piston 68, the force transfer rods 78 move in an axial direction rightward (as viewed in FIGS. 3-5) causing the clutch pack 24 to open. A hydraulic port 80 can extend from an outer diameter of the piston housing 66 and can be configured to fluidly couple to the hydraulic control unit 16, as described herein in more detail.

As shown in FIGS. 2 and 3, axle assembly 12 can include a cover 82 that forms part of the axle housing 26, and the cover 82 can include a boss or aperture 84 formed therein disposed proximate to the hydraulic port 80. The aperture 84 is configured to receive a dual O-ring seal hydraulic fitting 86 (FIG. 1) for fluidly coupling to the hydraulic port 80 of the clutch actuator assembly 44. The hydraulic fitting 86 is configured to seal both the hydraulic circuit (FIG. 1) and a sump of the axle assembly 12.

Figure 7:
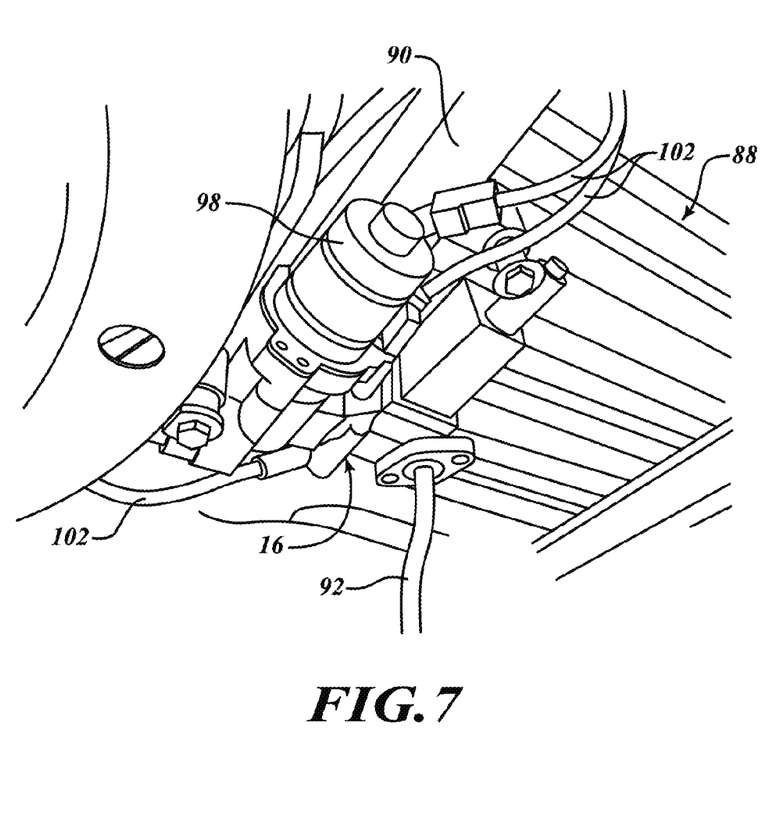
FIG. 7 is perspective view of the hydraulic control unit shown in FIG. 1 secured to a vehicle underbody.

As shown in FIGS. 1 and 7, the hydraulic control unit 16 is coupled to a vehicle underbody 88 in a location remote from the axle assembly 12 and the electro-hydraulic limited slip differential assembly 14. In the illustrated example, the hydraulic control unit 16 is coupled to a vehicle component that is stationary or generally stationary during movement of the vehicle, for example, a cross-member 90 (FIG. 7) of the vehicle frame. A hydraulic conduit 92 (FIG. 1) can be fluidly coupled between the hydraulic control unit 16 and the hydraulic fitting 86. As such, the hydraulic control unit 16 is configured to supply hydraulic fluid to the clutch actuator assembly 44 for selective actuation thereof.

Figure 6:
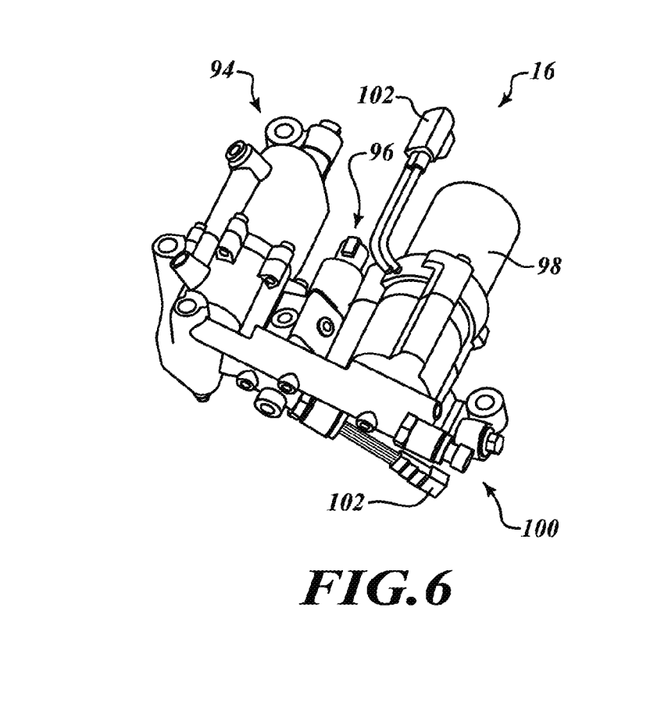
FIG. 6 is a perspective view of an example hydraulic control unit shown in FIG. 1 in accordance with the principles of the present disclosure.

As shown in FIGS. 6 and 7, the hydraulic control unit 16 can generally include an integrated accumulator and sump 94, a control valve 96, a motor and hydraulic pump 98, and one or more sensors 100. As illustrated in FIG. 7, electrical conduits 102 can be coupled to each of control valve 96, motor and hydraulic pump 98, and the one or more sensors 100.

Figure 8:
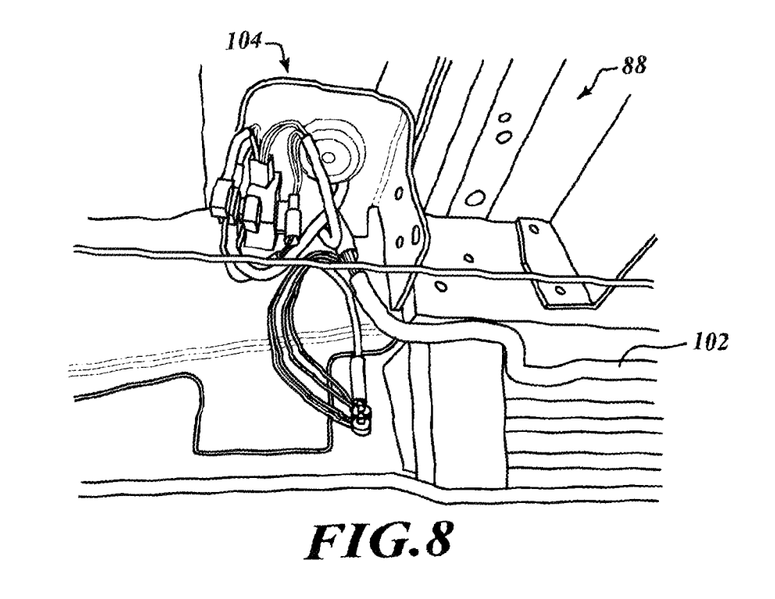
FIG. 8 is a perspective view of an example wiring harness and cab pass-through that may be used with the system shown in FIG. 1 in accordance with the principles of the present disclosure.
Figure 9:
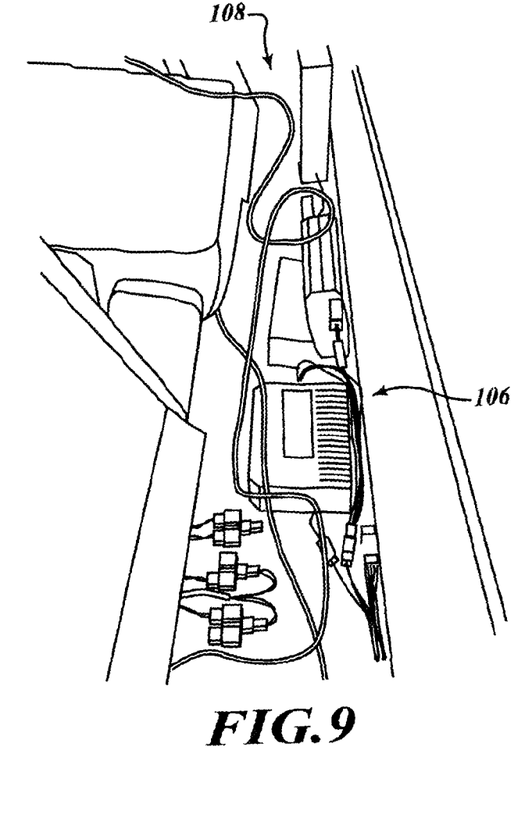
FIG. 9 is a perspective view of an example electronic control unit that may be used in signal communication with the system shown in FIG. 1 in accordance with the principles of the present disclosure.
Figure 10:
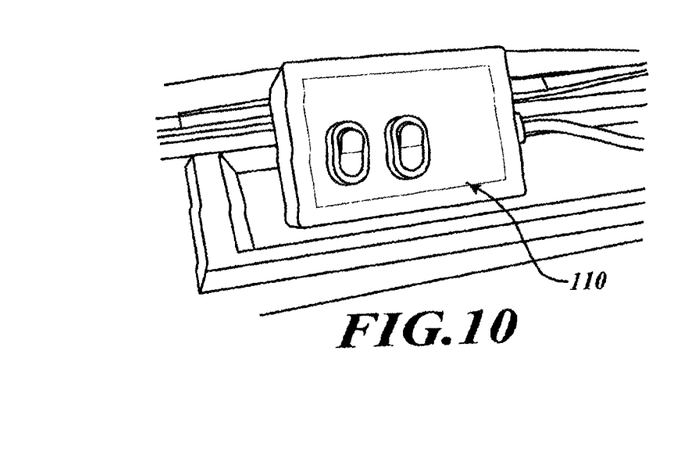
FIG. 10 is a perspective view of an example selector box that may be used in signal communication with the system shown in FIG. 1 in accordance with the principles of the present disclosure.

As shown in FIGS. 8-10, the plurality of electrical conduits 102 can be routed through a wire harness and cab pass-through 104 (FIG. 8) and electrically coupled to an Electronic Control Unit (ECU) 106 (FIG. 9). In the illustrated example, ECU 106 can be disposed within a cab 108 of the vehicle. A selector box 110 (FIG. 10) can be disposed inside the vehicle (e.g. on a dashboard) and is configured for signal communication with the ECU 106 to automatically or manually switch the electronic limited slip differential capability of the electronic LSD system 10 on and off.

Turning now to FIGS. 11-15, an example electro-hydraulic limited slip differential (LSD) system 10B constructed in accordance with additional features is shown. In the illustrated example, the electro-hydraulic limited slip differential (LSD) system generally includes an axle assembly 12B, an electro-hydraulic limited slip differential assembly 14B, and a hydraulic control unit (HCU) 16B. Unless otherwise described, the LSD system 10B can have similar features as the LSD system 10 described above. In the example shown, axle assembly 12B is a live or active axle configured to move (e.g., jounce and rebound) a predetermined distance. Advantageously, the HCU 16B is located on the vehicle at a location remote from the active axle assembly 12B, thereby enabling movement of the active axle assembly 12B without clearance or packaging issues that can result from components directly coupled to the live axle assembly 12B.

Figure 11:
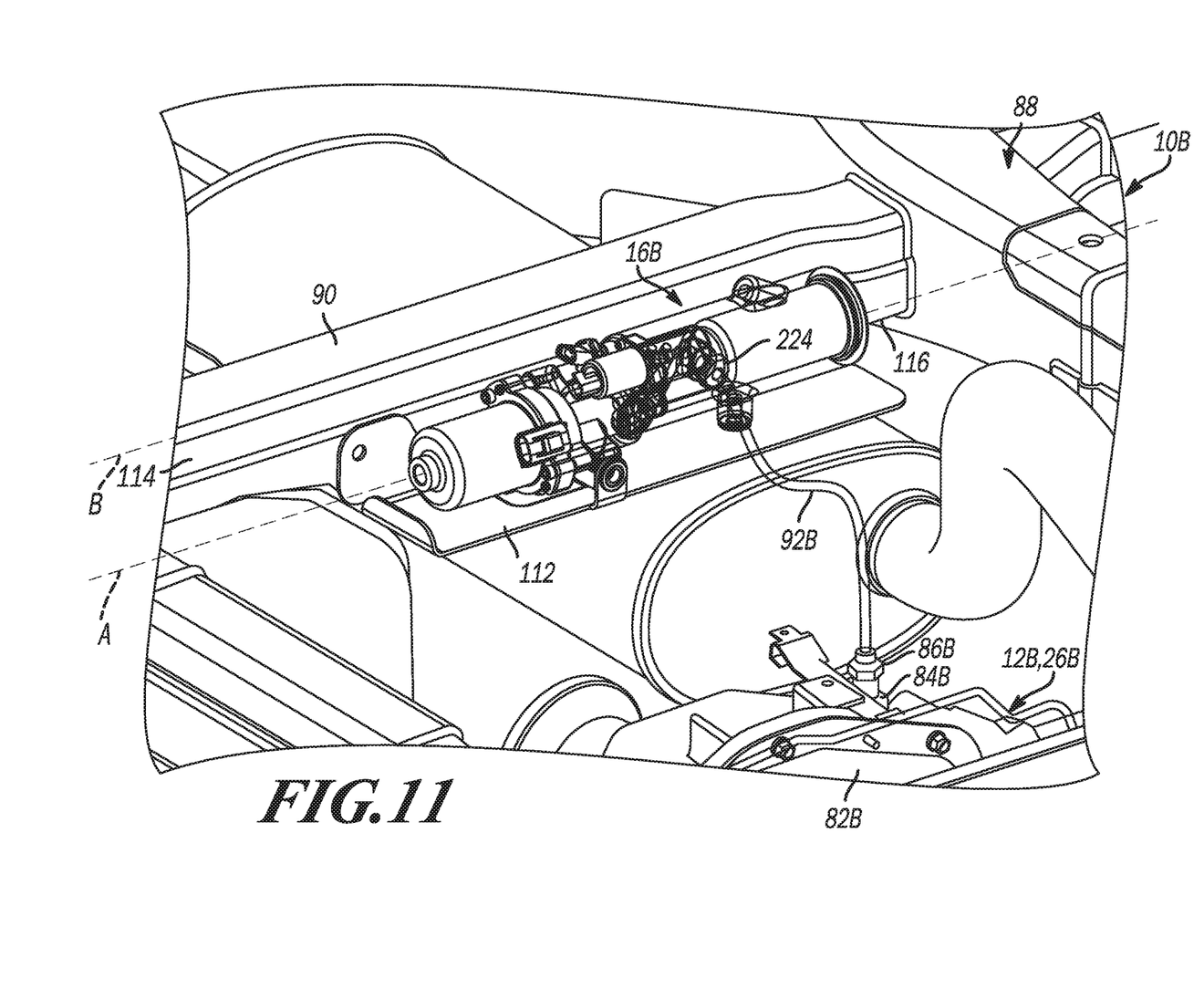
FIG. 11 is a perspective view of an example vehicle and electro-hydraulic limited slip differential system in accordance with additional principles of the present disclosure.

As shown in FIG. 11, axle assembly 12B can include a cover 82B that forms part of the axle housing 26B. The axle assembly 12B can include an aperture 84B formed therein disposed proximate to the hydraulic port. The aperture 84B is configured to receive a dual O-ring seal hydraulic fitting 86B for fluidly coupling to the hydraulic port 80 of the clutch actuator assembly 44 (See FIGS. 3 and 4). The hydraulic fitting 86B is configured to seal both the hydraulic circuit and a sump of the axle assembly 12B.

As shown in FIG. 11, the HCU 16B is coupled to a vehicle underbody 88 in a location remote from the live axle assembly 12B and the electro-hydraulic limited slip differential assembly 14 (see FIG. 3). In the illustrated example, the HCU 16B is coupled to a vehicle component that is stationary or generally stationary during movement of the vehicle, for example, a cross frame rail 90 of the vehicle frame. As shown, HCU 16B extends generally along a longitudinal axis 'A' that is parallel to or substantially parallel to a cross-car axis 'B' (i.e., orthogonal to an axis extending between a front and rear of the vehicle). A hydraulic conduit 92B can be fluidly coupled between the HCU 16B and the hydraulic fitting 86B. As such, the HCU 16B is configured to supply hydraulic fluid to the clutch actuator assembly 44 (see FIG. 3) for selective actuation thereof.

As shown in FIGS. 11-15, the HCU 16B can generally include an integrated piston accumulator and reservoir assembly 100B, a control valve assembly 102B, a motor and hydraulic pump assembly 104B, and one or more sensors. For example, a pressure sensor 106B can be operably coupled to the accumulator and reservoir assembly 100B, and a pressure sensor 108B can be operably coupled to the control valve assembly 102B. Pressure sensor 106B can be configured to monitor a pressure within the piston accumulator and reservoir assembly 100B, and pressure sensor 108B can be configured to monitor a pressure within the control valve assembly 102B. One or more electrical conduits (not shown) can be coupled to each of assemblies 100B, 102B, 104B and sensors 106B, 108B via an electrical connector 110 in order to provide power thereto. HCU 16B can be coupled to the vehicle (e.g., frame rail 90) via a support bracket 112.

Figure 12:
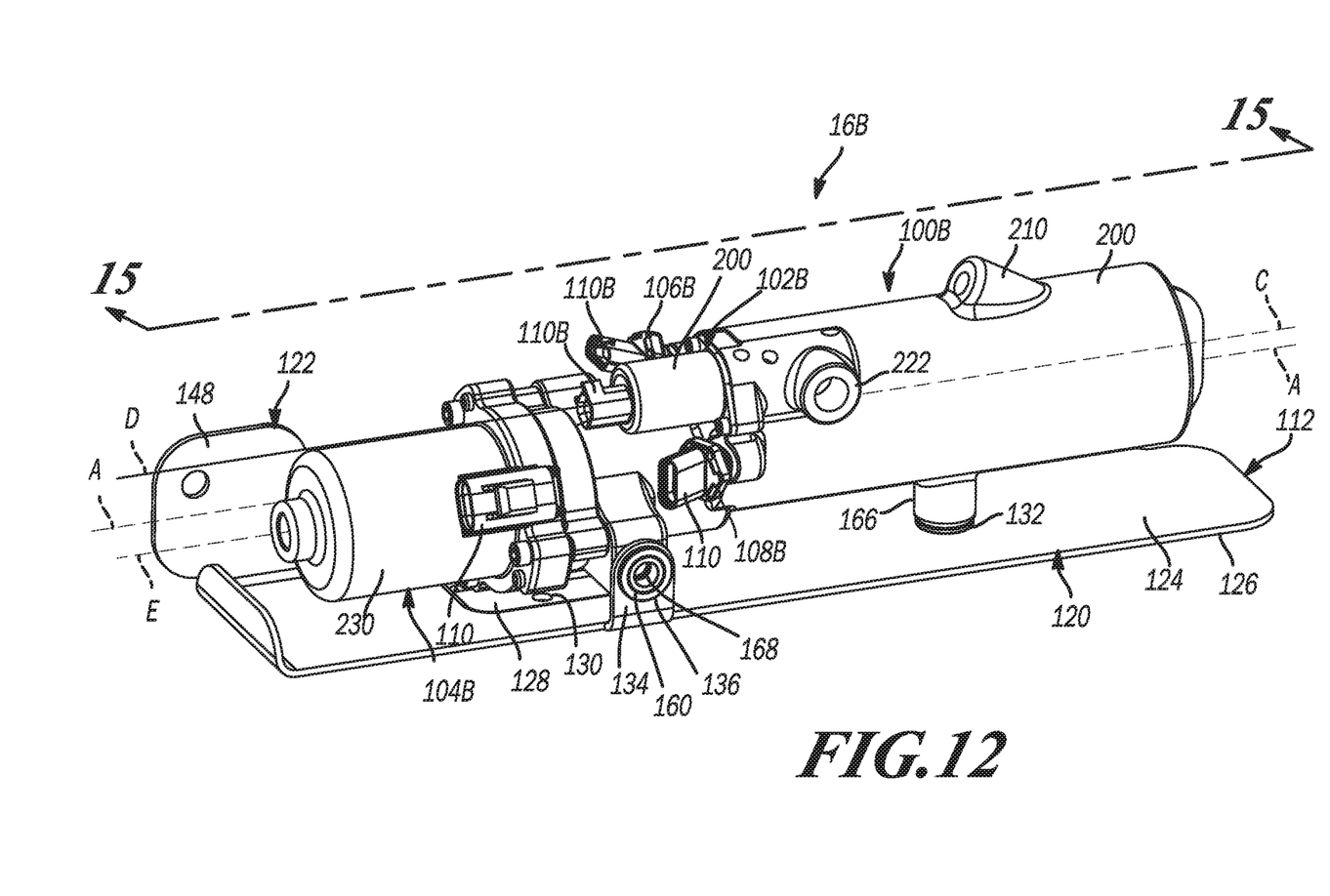
FIG. 12 is a front perspective view of an example hydraulic control unit shown in FIG. 11 in accordance with the principles of the present disclosure.

As shown in FIG. 12, piston accumulator and reservoir assembly 100B and motor and hydraulic pump assembly 104B are oriented in a generally end-to-end arrangement such that HCU 16B defines and extends along longitudinal axis 'A'. Moreover, assembly 100B defines and extends along a longitudinal axis 'C', control valve assembly 102B defines and extends along a longitudinal axis D', and assembly 104B defines and extends along a longitudinal axis 'E'. As illustrated, axes 'C', 'D', and 'E' each extend parallel to or substantially parallel to HCU longitudinal axis 'A', which is also parallel to or substantially parallel to cross-car axis 'B' (FIG. 11). In this way, HCU 16B provides a low profile end-to-end configuration that improves packaging, ground clearance, and ease of assembly to the vehicle.

The support bracket 112 is configured to receive the HCU 16B and is then coupled to the vehicle frame rail 90. As shown in FIGS. 12-15, support bracket 112 generally includes a base wall 120 and a partial rear wall 122 extending perpendicular or substantially perpendicular thereto. The base wall 120 includes an upper surface 124 and an opposite lower surface 126. An indentation 128 is formed in the base wall 120 to provide clearance for portions of the HCU 16B, and a drain aperture 130 is formed in the indentation 128 to facilitate draining of fluid accumulating within the indentation 128. An aperture 132 (FIG. 15) is formed through base wall 120 to facilitate coupling HCU 16B to the bracket 112. A tab 134 (FIG. 12) can extend upwardly from base wall 120 and is oriented perpendicular or substantially perpendicular thereto. The tab 134 can include an aperture 136 configured to facilitate coupling HCU 16B to the bracket 112.

Figure 13:
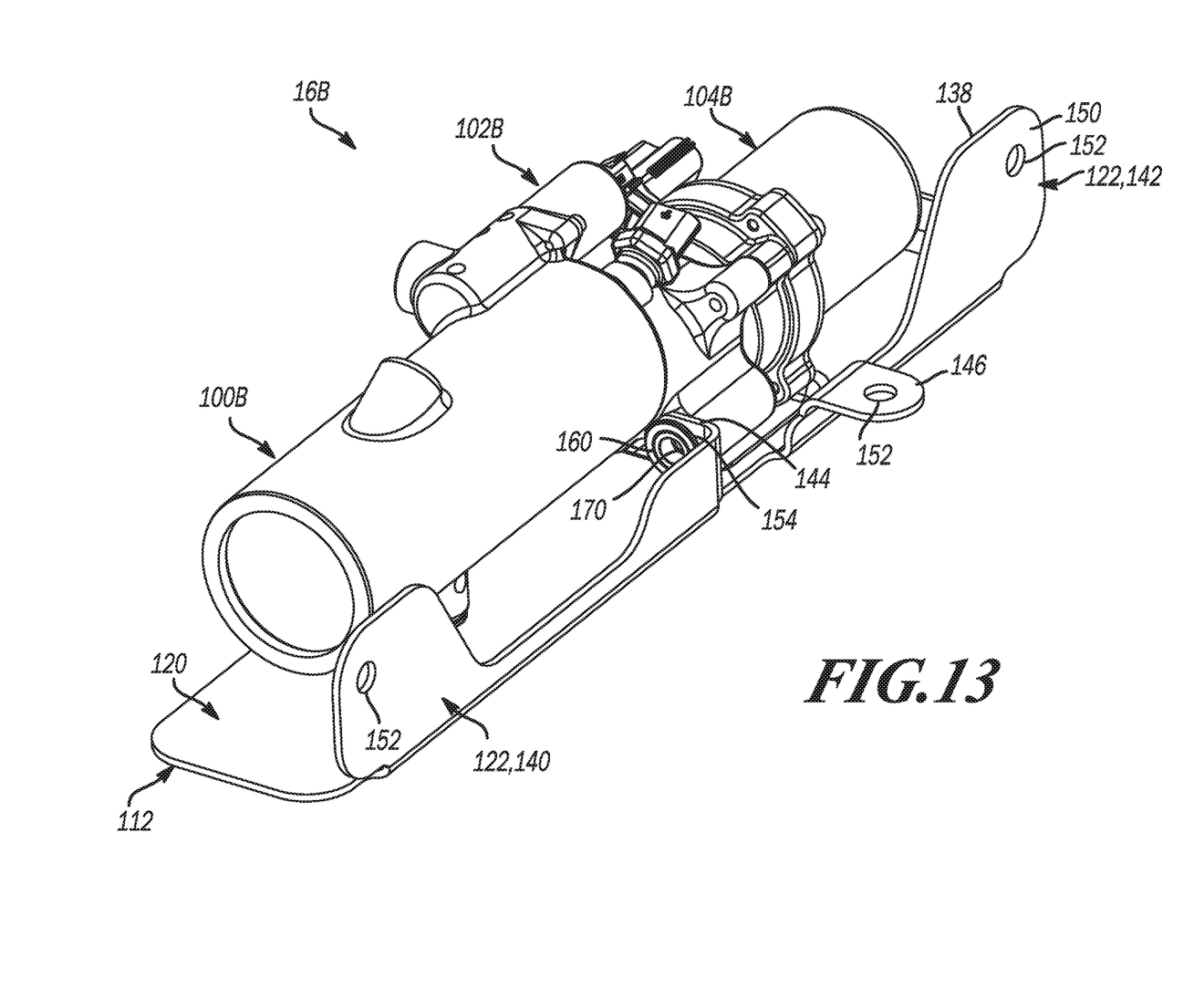
FIG. 13 is a rear perspective view of the hydraulic control unit shown in FIG. 11.
Figure 14:
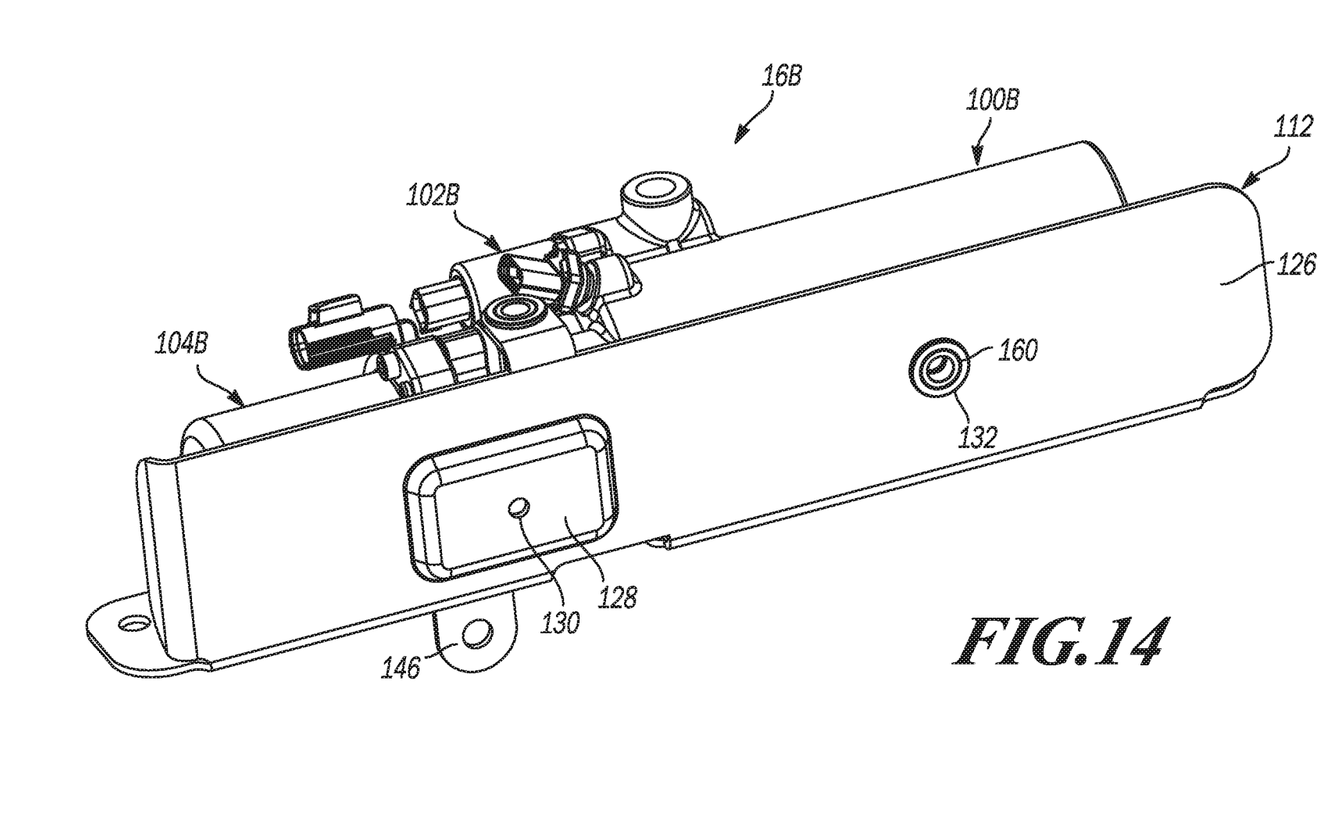
FIG. 14 is a bottom perspective view of the hydraulic control unit shown in FIG. 12.

With particular reference to FIG. 13, partial rear wall 122 generally includes a first connecting tab 140 and a second connecting tab 142. A third connecting tab 144 and a fourth connecting tab 146 can extend outwardly from rear wall 122. The first and second connecting tabs 140, 142 each include a first surface 148, an opposite second surface 150, and a fastener aperture 152 formed therethrough. The first and second connecting tabs 140, 142 can be oriented perpendicular to or substantially perpendicular to the base wall 120. The second surfaces 150 are configured to abut against a portion of the frame rail 90 such as a wall 114 (FIG. 11) of frame rail 90, and a fastener (not shown) can be inserted through each fastener aperture 152 to couple bracket 112 to the frame rail 90 (or other vehicle component).

In the illustrated example, the third connecting tab 144 can extend outwardly from the first surface 148 of the first connecting tab 140 toward the HCU 16B. In one example, the third connecting tab 144 is oriented perpendicular to or substantially perpendicular to the base wall 120 and/or the partial rear wall 122. The third connecting tab 144 can include an aperture 154 configured to facilitate coupling HCU 16B to the bracket 112.

The fourth connecting tab 146 can extend outwardly from the second surface 150 of the second connecting tab 142 away from the HCU 16. In one example, the fourth connecting tab 146 is oriented perpendicular or substantially perpendicular to the partial rear wall 122, and parallel to or substantially parallel to the base wall 120. The fourth connecting tab 146 can include a fastener aperture 156 and is configured to abut against a portion of the frame rail 90 such as a wall 116 (FIG. 11) of frame rail 90. A fastener (not shown) can be inserted through fastener aperture 156 to further couple bracket 112 to the frame rail 90 (or other vehicle component).

As described, in the example embodiment, HCU 16B can be coupled to the support bracket 112 via apertures 132, 136, and 150. Each of apertures 132, 136, and 150 can be configured to receive an insert assembly 160. As illustrated in FIG. 8, insert assembly 160 can include an elastomeric grommet 162 with an internal sleeve 164. The elastomeric grommet 162 is configured to prevent noise, vibration, and harshness (NVH) between the HCU 16B and support bracket 112, and internal sleeve 164 is a rigid member (e.g., metal) configured to provide a positive stop between the HCU 16B and a fastener (not shown) to prevent crushing and/or other damage to the elastomeric grommet 162.

As shown in FIG. 12, aperture 132 can be aligned with a protrusion 166 extending from the piston spring accumulator and reservoir assembly 100B. A fastener (not shown) can be inserted through aperture 132 and insert assembly 160 into the protrusion 166 to provide one coupling between the HCU 16B and support bracket 112. Similarly, aperture 136 of tab 134 can be aligned with a receiving aperture 168 formed in HCU 16B. A fastener (not shown) can be inserted through aperture 136 and insert assembly 160 into the receiving aperture 168 to provide another coupling between the HCU 16B and support bracket 112. As shown in FIG. 13, aperture 150 of third connecting tab 144 can be aligned with a receiving aperture 170 formed in HCU 16B. A fastener (not shown) can be inserted through aperture 150 and insert assembly 160 into the receiving aperture 170 to provide yet another coupling between the HCU 16B and support bracket 112. Accordingly, HCU 16B is coupled to the support bracket 112 along three different planes and, along with insert assemblies 160, NVH between HCU 16 and support bracket 112 can be prevented in all orthogonal directions (i.e., +/−x-direction, +/−y-direction, and +/−z-direction).

Figure 15:
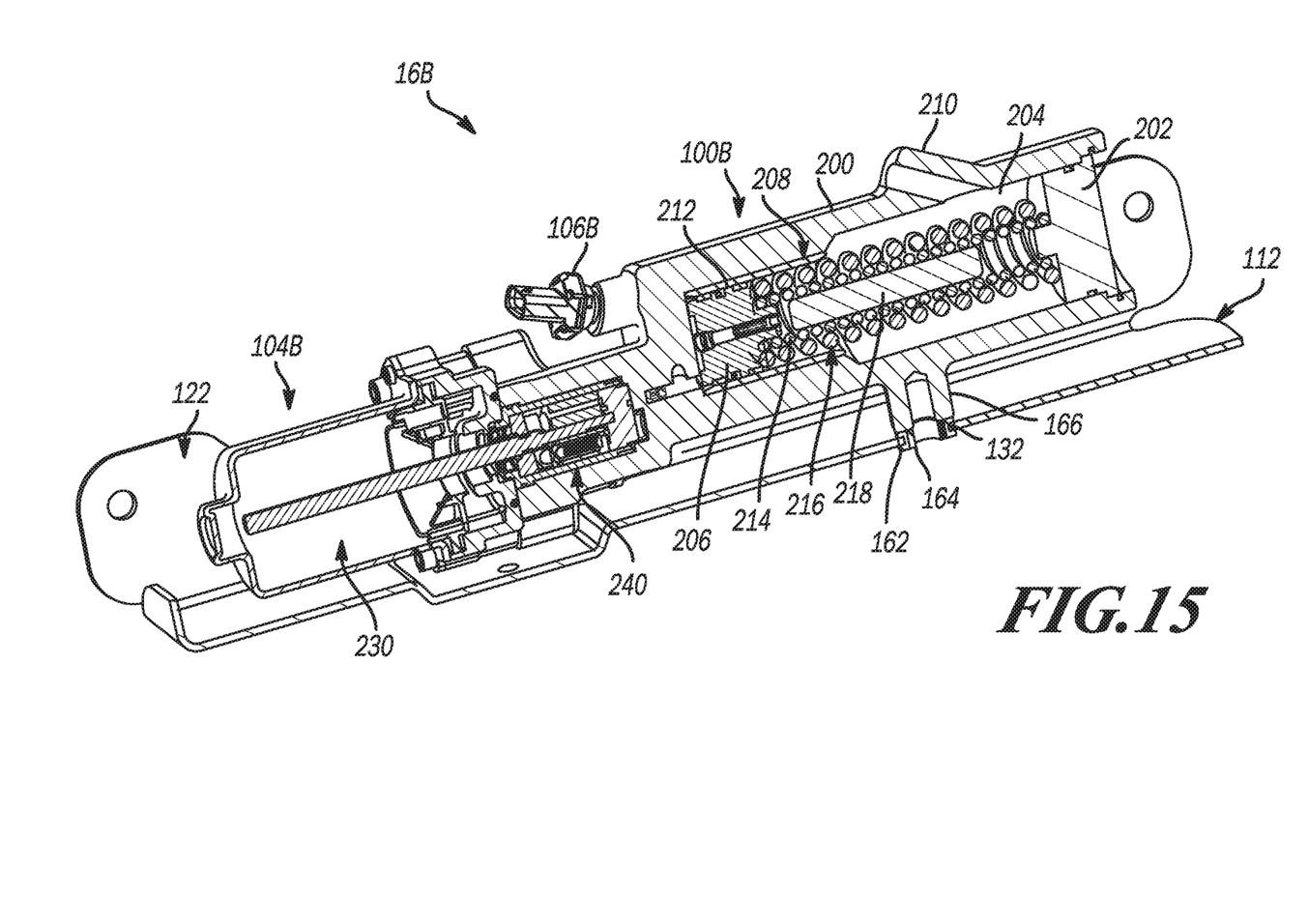
FIG. 15 is a cross-sectional view of the hydraulic control unit shown in FIG. 12 taken along line 15-15 in accordance with the principles of the present disclosure.

With further reference to FIG. 15, HCU 16B will be described in more detail. The piston accumulator and reservoir assembly 100 generally includes a housing 200 and cap 202 defining an accumulator/reservoir chamber 204, a piston 206, a biasing assembly 208, and a vent/fill passage 210. A sleeve 212 can be disposed within the chamber 204 and can slidably receive the piston 206 therein. Biasing assembly 208 can include a first biasing member 214 (e.g., a spring), a second biasing member 216 (e.g., a spring), and a support rod 218. The first biasing member 214 can have a first spring rate while the second biasing member 216 can have a second spring rate. The first and second spring rates cooperate together to provide a desired spring rate for the biasing assembly 208. The support rod 218 can be disposed within the first and second biasing members 214, 216 to facilitate structural integrity and prevent either of first and second biasing member 214, 216 from undesired bending. Fluid is pumped behind the piston 206 into the chamber 204 to cause the piston 206 to translate toward the cap 202.

The control valve assembly 102 can include a three-way proportional regulating valve 220 that can be securely coupled to the housing 200. The three-way proportional regulating valve 220 can be configured to regulate fluid pressure within the HCU 16B. A hydraulic port 222 can be formed in the housing 200. As shown in FIG. 11, hydraulic port 222 can receive a hydraulic coupling 224, which is fluidly coupled to hydraulic port 80 and hydraulic fitting 86 via hydraulic conduit 92.

The motor and pump assembly 104B can include a motor 230 that can operate a piston pump or gerotor gear assembly 240 and can be conventionally constructed. The gerotor gear assembly 240 can comprise an inner gerotor gear and an outer gerotor gear. The operation of the gerotor gear assembly can be conventional where relative rotation of the inner and outer gerotor gears can cause a pumping action on the fluid contained in the housing 200. In examples where a piston pump is used, the piston pump can cause a pumping action on the fluid contained in the housing 200. The pumping action ultimately causes the fluid to be pumped into the accumulator chamber 204. In doing so, the biasing members 214, 216 at least partially collapse and introduce a pre-charge into the system. In this regard, the motor 230 is not required to run constantly. The fluid pressure can be introduced into the limited slip differential 14 by the biasing members 214, 216 acting on the piston 206. The vent/fill passage 210 can include a relieve valve (not shown) and can protect the system by releasing fluid in the event of an over pressure malfunction.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A hydraulic control unit (HCU) assembly for an electro-hydraulic limited slip differential system for a vehicle, the HCU assembly comprising:
    a support bracket configured to couple to an underbody of the vehicle in a location remote from a live axle assembly of the vehicle; and
    an HCU including a combined accumulator and reservoir assembly, a control valve assembly, and a motor and hydraulic pump assembly, the HCU coupled to the support bracket,
    wherein the support bracket comprises a base wall and a rear wall, and
    wherein the integrated accumulator and reservoir assembly includes a housing having a protrusion extending outwardly therefrom, the protrusion disposed against the support bracket base wall and configured to receive a fastener to couple the housing to the support bracket.

2. The HCU assembly of claim 1, wherein the integrated accumulator and reservoir assembly and the motor and hydraulic pump assembly are arranged end-to-end such that the HCU extends generally along a first longitudinal axis.

3. The HCU assembly of claim 2, wherein the first longitudinal axis is substantially parallel to a cross-car axis of the vehicle.

4. The HCU assembly of claim 2, wherein the integrated accumulator and reservoir assembly extends along a second longitudinal axis, the control valve assembly extends along a third longitudinal axis, and the motor and hydraulic pump assembly extends along a fourth longitudinal axis,
    wherein the second, third, and fourth axes are substantially parallel to the first longitudinal axis.

5. A hydraulic control unit (HCU) assembly for an electro-hydraulic limited slip differential system for a vehicle, the HCU assembly comprising:
    a support bracket configured to couple to an underbody of the vehicle in a location remote from a live axle assembly of the vehicle; and
    an HCU including a combined accumulator and reservoir assembly, a control valve assembly, and a motor and hydraulic pump assembly, the HCU coupled to the support bracket,
    wherein the support bracket comprises a base wall and a rear wall, and
    wherein the support bracket includes a tab having an aperture, and wherein the integrated accumulator and reservoir assembly includes a housing having a receiving aperture formed therein, the receiving aperture aligned with the tab aperture and configured to receive a fastener to couple the housing to the support bracket, wherein the tab extends from one of the support bracket rear wall and the support bracket base wall, wherein the base wall includes an indentation formed therein and configured to provide clearance to a portion of the HCU, wherein the indentation includes a drain aperture configured to drain fluid accumulating in the indentation.

6. The HCU assembly of claim 5, wherein the rear wall includes a first surface and an opposite second surface, wherein the rear wall defines a first connecting tab and a second connecting tab each configured to abut against a portion of the vehicle underbody to couple the support bracket to the vehicle.

7. The HCU assembly of claim 6, further comprising a third connecting tab configured to couple to the HCU, and a fourth connecting tab configured to couple to the portion of the vehicle underbody, wherein the third connecting tab extends outwardly from the first surface, and the fourth connecting tab extends outwardly from the second surface.

8. A hydraulic control unit (HCU) assembly for an electro-hydraulic limited slip differential system for a vehicle, the HCU assembly comprising:
    a support bracket configured to couple to an underbody of the vehicle in a location remote from a live axle assembly of the vehicle; and
    an HCU including a combined accumulator and reservoir assembly, a control valve assembly, and a motor and hydraulic pump assembly, the HCU coupled to the support bracket,
    wherein the support bracket comprises a base wall and a rear wall, and
    an insert assembly disposed within a tab aperture and configured to dampen relative movement between the HCU and the support bracket, the insert assembly including an internal sleeve disposed radially within a grommet.

* * * * *